United States Patent [19]
Oetiker

[11] Patent Number: 5,325,578
[45] Date of Patent: Jul. 5, 1994

[54] APPARATUS AND METHOD FOR AUTOMATICALLY INSTALLING CLAMPS

[75] Inventor: Hans Oetiker, Horgen, Switzerland

[73] Assignee: Hans Oetiker AG Maschinen- und Apparatefabrik, Switzerland

[21] Appl. No.: 160,004

[22] Filed: Feb. 24, 1988

Related U.S. Application Data

[63] Continuation-in-part of Ser. No. 16,794, Feb. 20, 1987, abandoned.

[51] Int. Cl.$^5$ .................. B23P 17/00; B21D 53/56
[52] U.S. Cl. ......................... 29/429; 29/450; 29/786; 29/788; 29/790; 221/156; 221/209; 221/219
[58] Field of Search ............... 29/150, 243.52, 243.56, 29/439, 450, 429, 452, 508, 771, 786, 788, 790; 72/149, 155, 168, 292, 410, 133, 166, 169, 406, 48; 81/9.3; 221/200, 204, 209, 210, 219, 157, 164, 156; 222/167, 169; 414/225, 226; 901/6, 7

[56] References Cited

U.S. PATENT DOCUMENTS

| | | | |
|---|---|---|---|
| 1,738,218 | 12/1929 | Wheeler | 221/219 |
| 2,031,547 | 2/1936 | Reuther | 221/219 |
| 4,062,476 | 12/1977 | Brand et al. | 222/167 |
| 4,269,054 | 5/1981 | Eaton | 72/155 X |
| 4,398,720 | 8/1983 | Jones et al. | 901/6 X |
| 4,803,768 | 2/1989 | Golla | 901/6 X |

FOREIGN PATENT DOCUMENTS 1441481  5/1966  France ........................ 72/133

*Primary Examiner*—Jopseph M. Gorski
*Attorney, Agent, or Firm*—Paul M. Craig, Jr.

[57] ABSTRACT

A method and apparatus for automatically installing a clamp made from a flat blank on an object to be fastened thereby, in which individual blanks are separated from a supply of such blanks, are fed as individual blanks to a deformation station where the flat blank is deformed into circular shape, the thus-deformed clamp is transferred from the deformation station to the object to be fastened thereby where it is placed over the object, and the clamp is thereafter tightened.

44 Claims, 12 Drawing Sheets

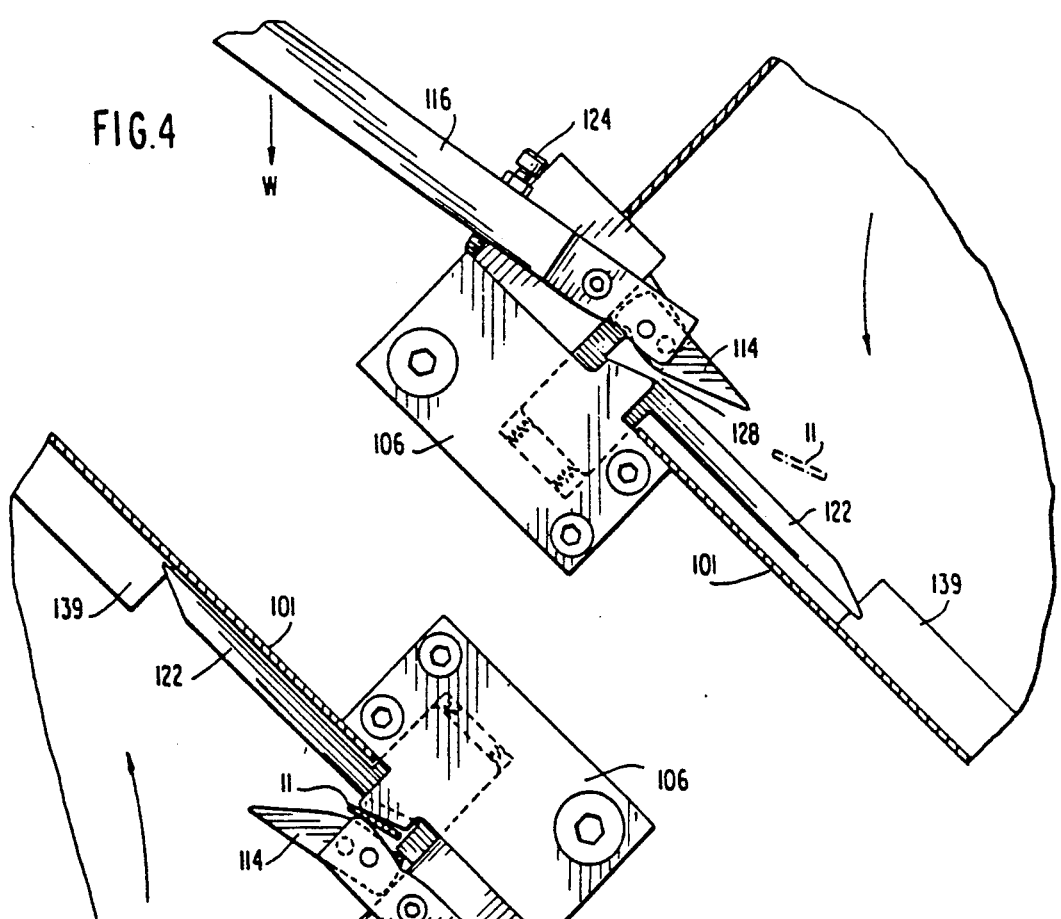
FIG. 4
FIG. 5
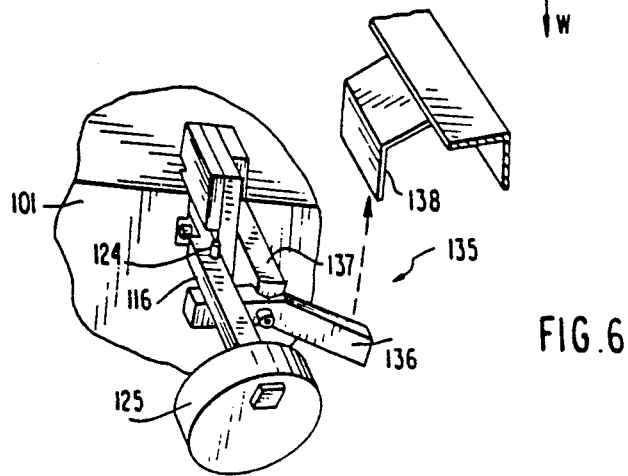
FIG. 6

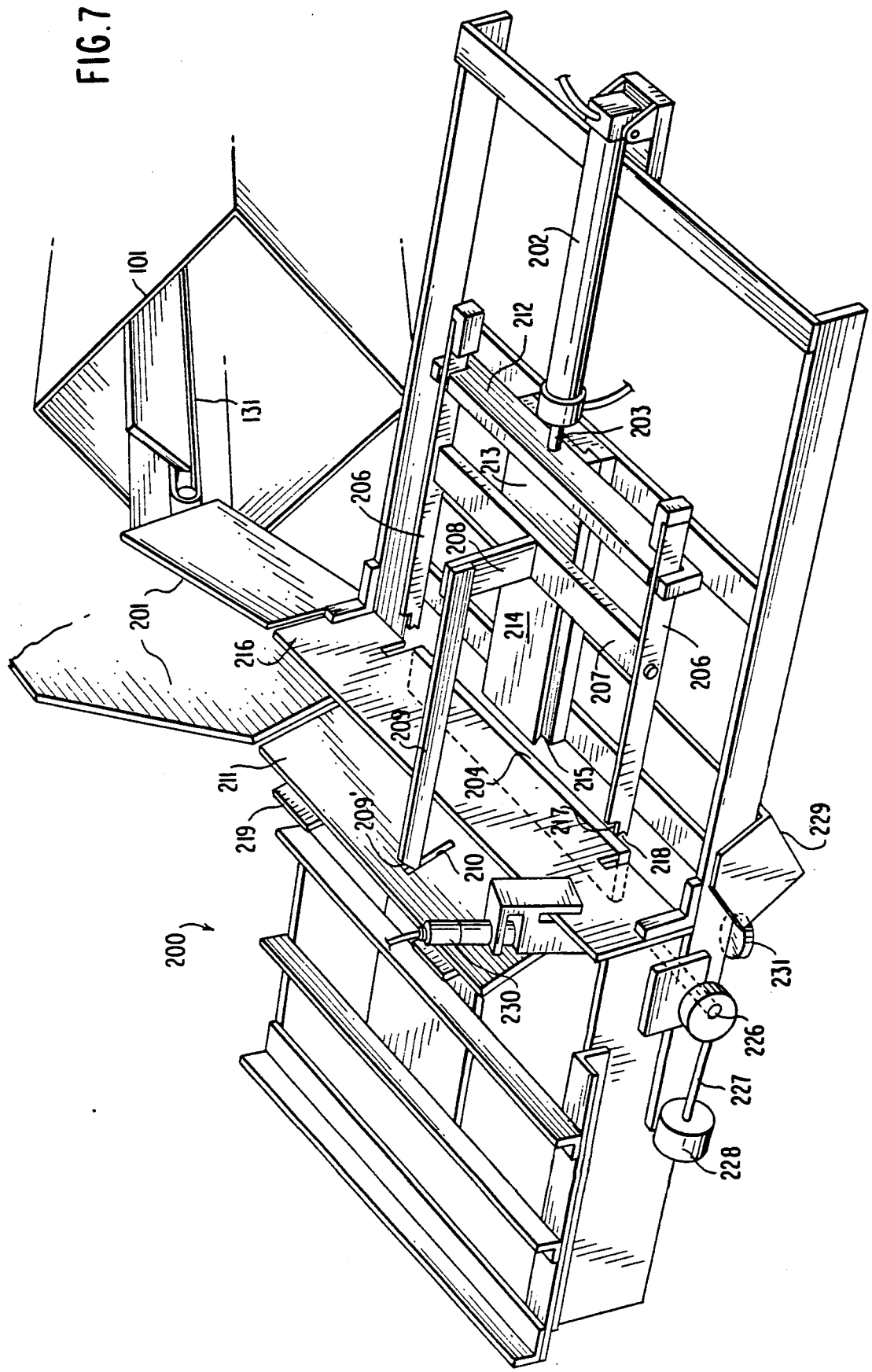

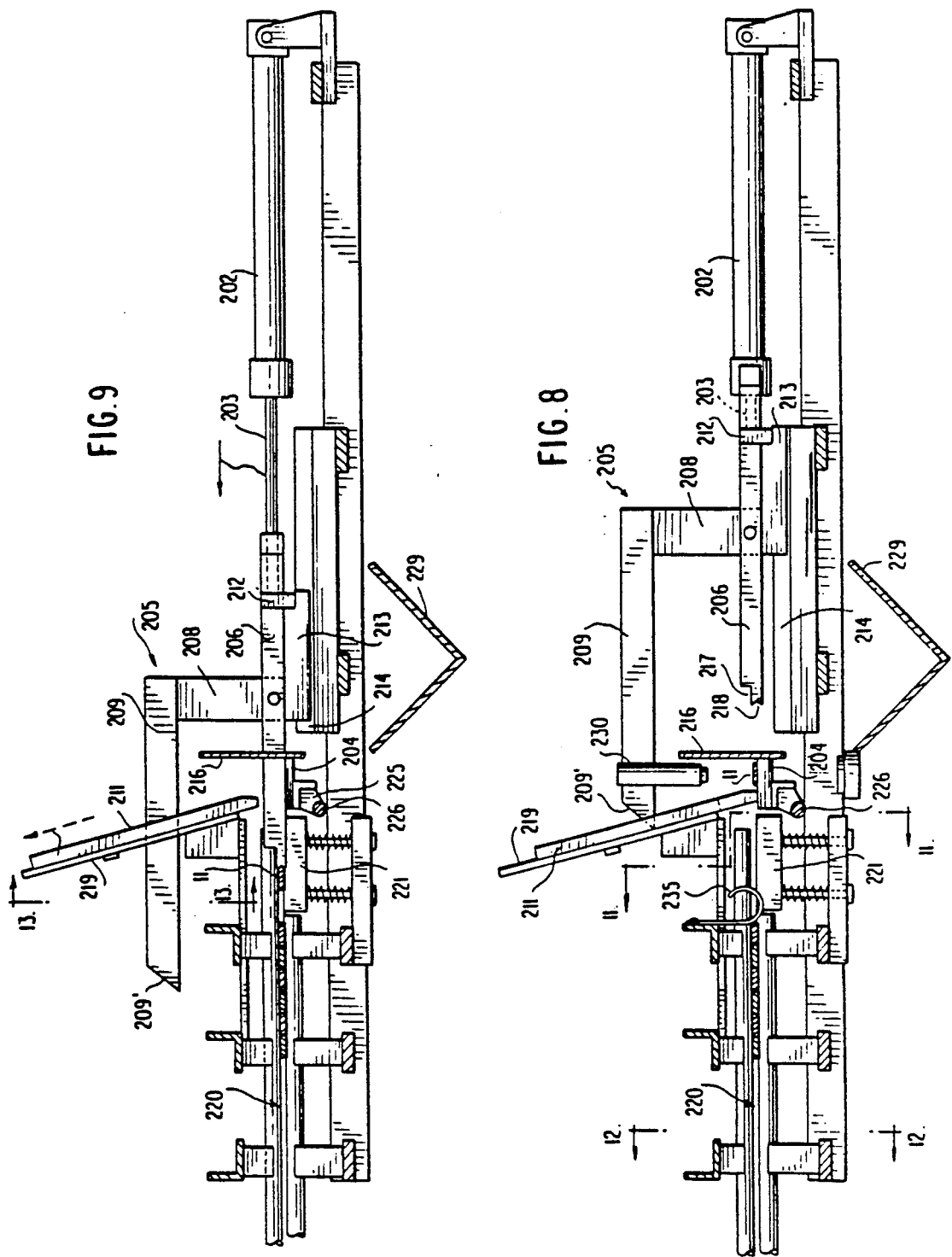

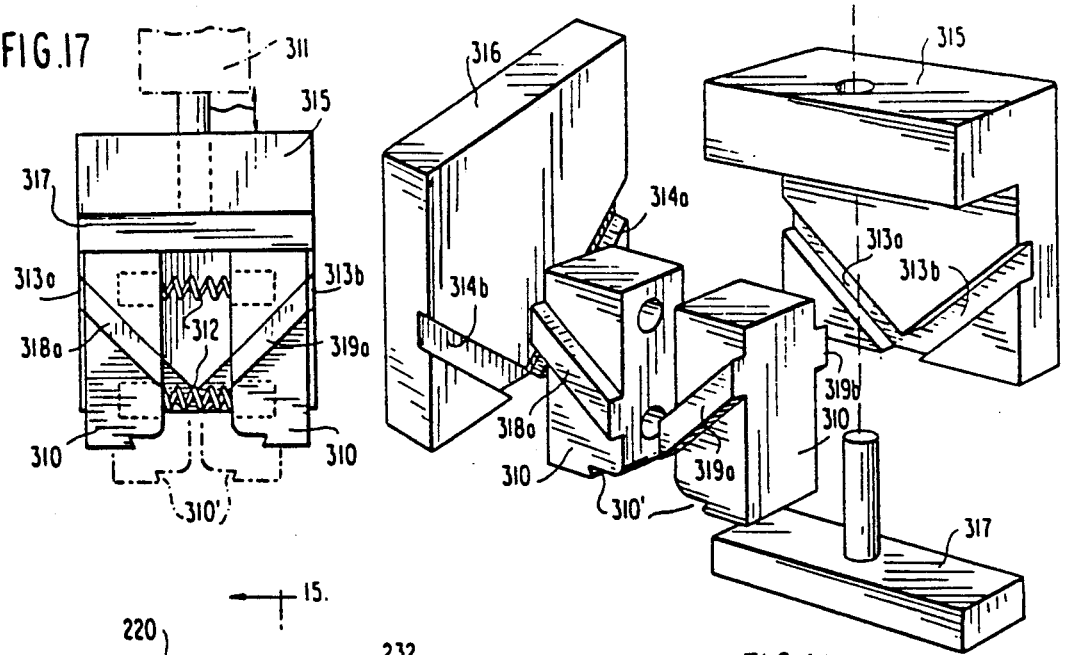
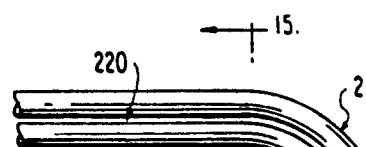
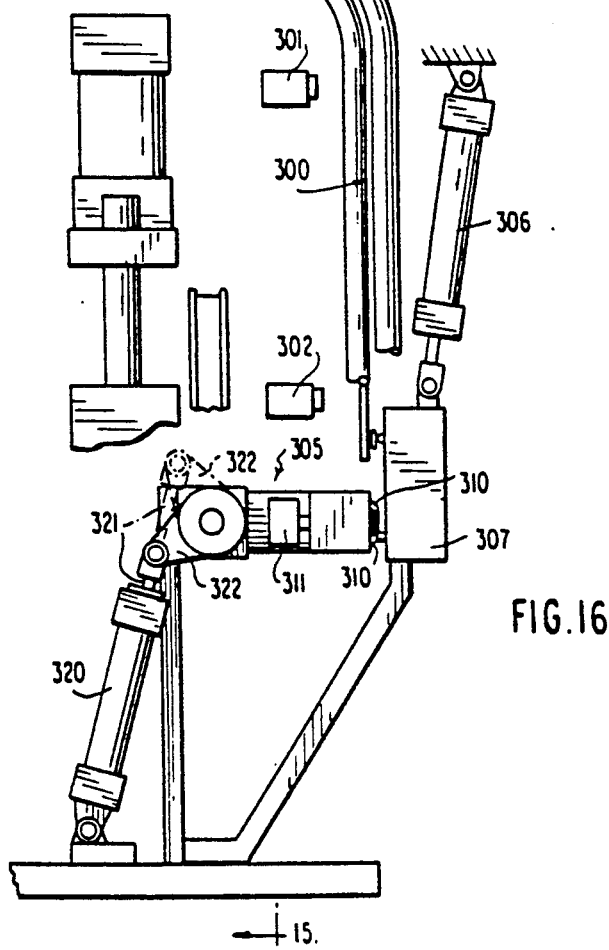

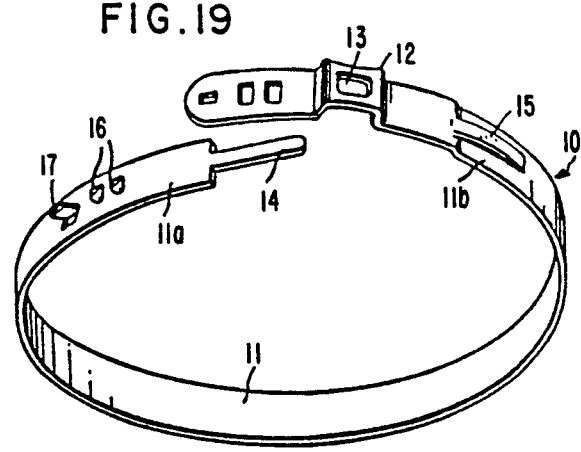
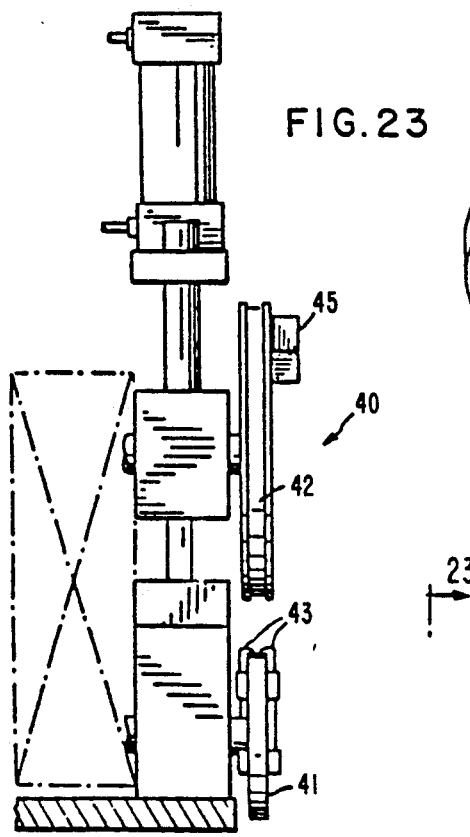
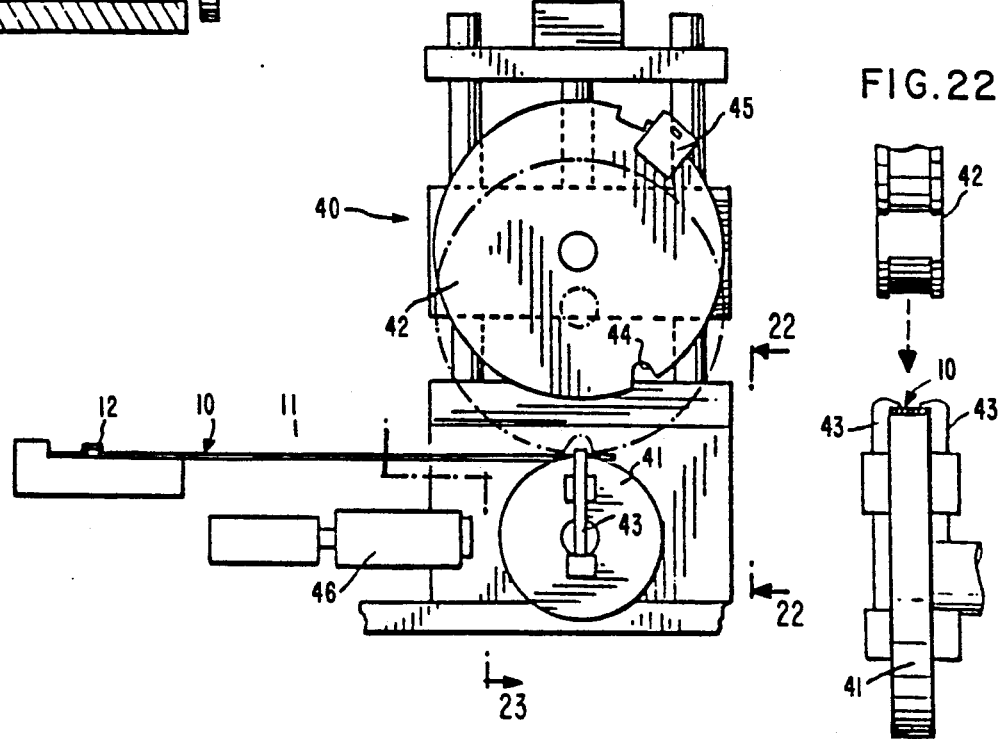

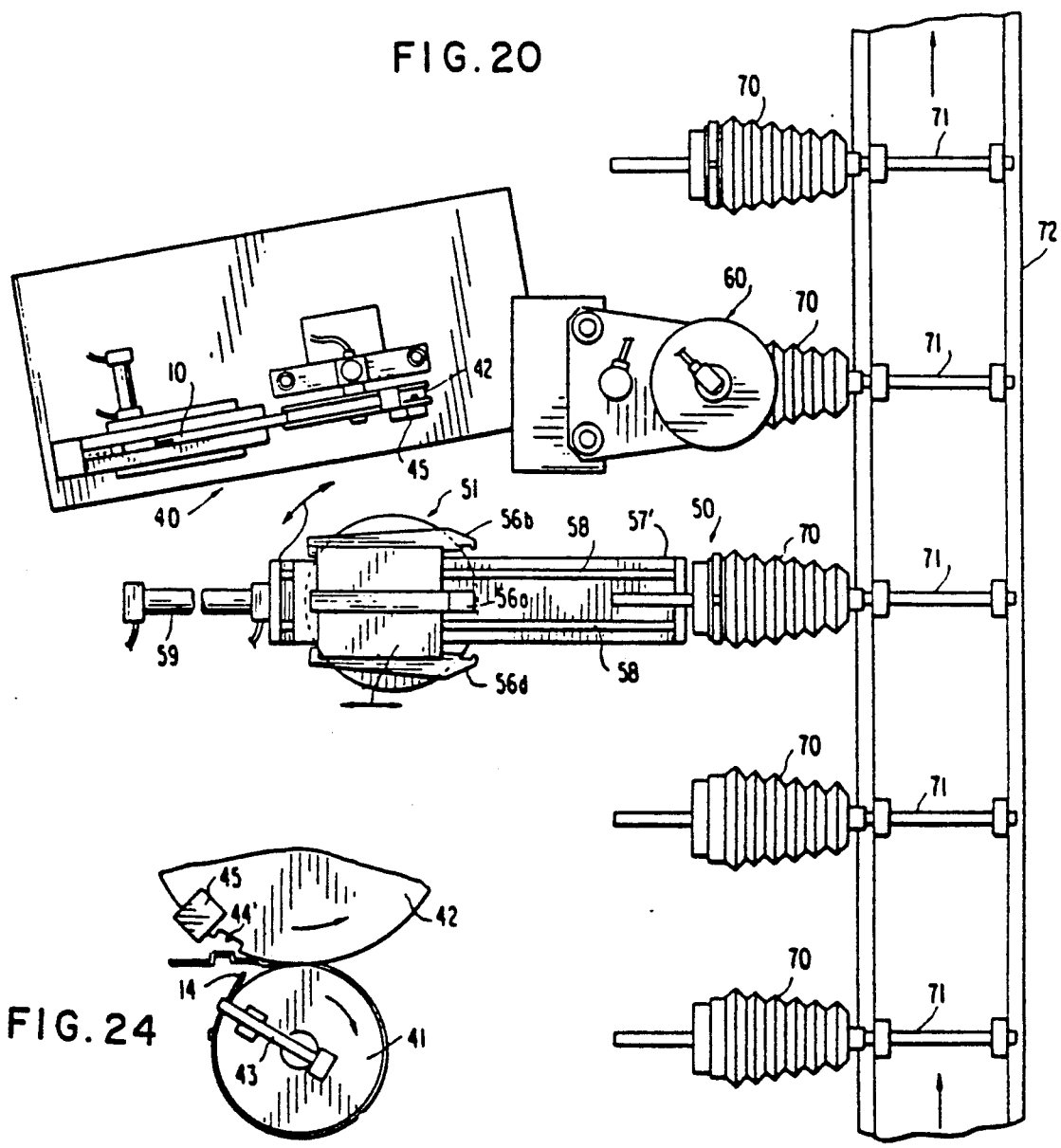
FIG. 20
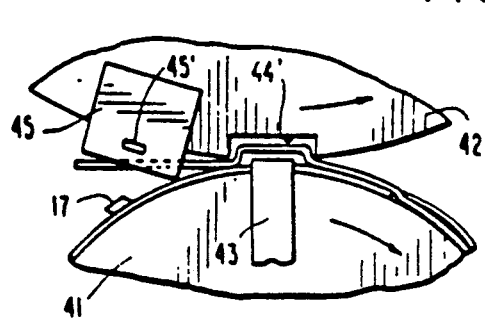
FIG. 24
FIG. 25
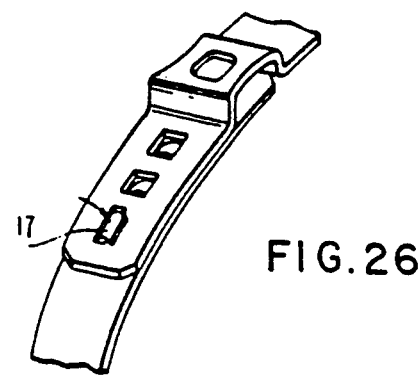
FIG. 26

APPARATUS AND METHOD FOR AUTOMATICALLY INSTALLING CLAMPS

The present application is a continuation-in-part application of my copending application Ser. No. 016,794, filed on Feb. 20, 1987, now abandoned, and entitled "Apparatus and Method for Automatically Installing and Fastening Clamps Onto Objects To Be Fastened."

FIELD OF THE INVENTION

The present invention relates to a method and apparatus for completely automatically installing clamps delivered as flat blanks on objects to be fastened thereby.

BACKGROUND OF THE INVENTION

Open clamp structures of the type, for example, illustrated in my prior U.S. Pat. No. 4,299,012 which include a so-called "Oetiker" ear have found widespread use in various applications. In one of these applications, such types of open clamps are used on the assembly line in the automobile industry to fasten axle boots onto axles. For that purpose, open clamps which are already preformed into substantially circular configuration are placed about the axle boots, are manually closed by engagement of the hooks provided on the inner band portion in apertures in the outer band portion and are thereafter fastened by contraction of the so-called "Oetiker" ear.

It is also known to ship open clamp structures to the user as flat blanks to benefit from the space- and cost-saving advantage which may be as high as 18:1 compared to the cost of transporting already circularly deformed clamps and to deform the flat blanks into a predetermined shape at the user. My prior U.S. Pat. Nos. 4,633,698 and 4,425,789 disclose machines for preforming the flat blanks at the user.

The manual operations involved heretofore required four persons at the assembly line before the installation of the clamps on the axle boots was completed. Because of human errors, a fifth person was normally present to control for proper installation of the clamp and a sixth person had to be available to remove improperly installed clamps and correct the deficiencies noticed by the control person by installing another clamp in its place. Thus, the prior art method for installing these clamps was relatively labor-intensive. Additionally, the waste was relatively high because the improperly installed clamp structures had to be destroyed in order to remove the same and thus became useless scrap. Apart from normal human errors, the problems in the prior art method were further compounded by lack of uniformity in the installation of the clamps, not only due to improper application of the pincer-like pneumatic tool closing the so-called "Oetiker" ear but also by vastly varying actuation of the pneumatic tool, which in turn resulted in closing of the ear at different speeds and with greatly differing forces. However, for metallurgical reasons, an excessively rapid deformation of the ear and/or excessive closing forces may affect the quality of installation of the installed clamp and its holding ability.

Thus, the prior art method as described above, which has been used on the assembly line in the automotive industry, entails numerous problems which not only affect cost, but also quality of the installation of the clamp on the axle boot and therewith the length of life of the axle assembly intended to retain in an absolutely tight manner the lubricant present on the inside of the axle boot.

My prior copending application Ser. No. 016,794, filed on Feb. 20, 1987, and entitled "Apparatus and Method for Automatically Installing and Fastening Clamps Onto Objects To Be Fastened" addressed these problems and described an apparatus and method for automatically installing clamps which far-reachingly eliminated the aforementioned shortcomings and drawbacks encountered in the prior art and assured a foolproof installation of the clamp structure, independent of human errors. According to the method and apparatus disclosed in my prior copending application, the subject matter of which is incorporated herein by reference, this is achieved by deformation of a flat blank into a circular shape, closing of the clamp, automatically transferring the closed clamp from a deformation station to a transfer station where the clamp is placed over the axle boot, holding the clamp in proper position on the axle boot by frictional engagement of the previously slightly deformed clamp, and thereafter contracting the ear in the thus-installed clamp to tighten the clamp structure about the axle boot and thus hold the latter tightly on the axle itself. According to my aforementioned copending application, the clamp is so mounted over the axle boot at the transfer station that it will stay in predetermined position while the axle, axle boot and clamp assembly thus-assembled is moved from the transfer station to the fastening station so as to assure that the pneumatic pincer-like tool closes the ear each time in a completely satisfactory manner owing to the relative fixed position between the ear and the pneumatic tool. The circular clamp, picked-up at the deformation station is thereby plastically deformed into slightly non-circular, oval shape and before being placed over the axle boot, is again elastically deformed back into circular shape so that upon release of the gripping fingers, the clamp will seek to return to its slightly non-circular configuration to produce a frictional engagement between the clamp and the axle boot keeping the ear in a predetermined position until it is engaged by the pneumatic pincer-like tool.

However, the apparatus and method according to my aforementioned application still required a person to insert the flat blank into the machine at the deformation station by manually picking up individual flat blanks, as shipped, from boxes that contained several bundles of 100 or more such flat blanks.

Drum-type devices are known in the art for feeding or dispensing various items, such as nails (U.S. Pat. No. 1,132,683), pencils (U.S. Pat. No. 1,853,071), phonograph needles (U.S. Pat. No. 1,412,826) or cores for cop-winding machines (U.S. Pat. No. 2,843,509). However, none of these prior art devices are suitable for the present invention which involves separating individual, relatively thin elongated and flat clamp blanks from a large supply thereof by positively gripping the blank to be lifted to its release point above the other blanks in the supply which remain at the bottom in the rotating drum as a result of gravity. Furthermore, machines for applying clamps are known in the art, for example, as disclosed in U.S. Pat. No. 2,837,949. However, these prior art machines require manual operating steps necessitating the presence of operating personnel.

SUMMARY OF THE INVENTION

The present invention has as its primary object to eliminate the aforementioned shortcomings and drawbacks and to assure a completely automatic installation of the clamp structure which eliminates the need for any person directly involved in the operations.

The underlying problems are solved according to the present invention by a method and apparatus which automatically separates at a separating station individual clamps from a number of similarly oriented blanks as received by the customer, which may involve as many as several hundred such blanks, delivering the separated blanks to a feeding station, feeding the individual blanks from the feeding station to a deformation station where the blank is deformed into a clamp shape slightly larger than the diameter of the object over which it is to be installed, transferring the thus-deformed clamp from the deformation station to a transfer station where the clamp is placed over the axle boot and thereafter fastening the thus-installed clamp to tighten the same about the axle boot and thus hold the latter tightly on the axle itself.

According to another feature of the present invention, the feeding device is also provided with a mechanism ejecting all but individual blanks, for example, when two flat blanks stick together, and additionally is able to correct for an improper position of the ear in the feed position.

According to still another object of the present invention, the gripping mechanism in the separator device as well as the rejection mechanism in the feeding device operate automatically by the use of gravity to simplify the construction and improve operational reliability.

According to still another feature of the present invention, a reservoir is interposed between the feeding device and the deformation station to assure always ample supply of clamps for the cyclic operation of the machine which is synchronized with the assembly line. This is achieved by a sensor sensing the filling of the reservoir at a predetermined level in order to turn off the operation of the separator device and feeding device which are normally operated at such speed that the number of blanks separated and fed into the reservoir is greater than that required by the speed of the assembly line, i.e., cyclic operation of the machine. Another sensor which determines when a predetermined minimum level of blanks has been reached in the reservoir, will restart the operation of the separator device and feeding mechanism.

As mentioned above, the method and apparatus of my copending application involved plastic deformation of the ear to assure frictional engagement between the clamp and the axle boot, when installed on the latter, to thereby assure proper positioning of the ear as the axle boot is moved from the transfer station to the fastening station along the assembly line. I have now discovered that the need for separate transfer and fastening stations as well as plastic deformation of the ear can be eliminated according to the present invention if the functions of the transfer and fastening stations are combined in a single station and if the clamp installed on the axle boot is held in place by the finger members until the pincer-like tool has contracted the ear. This eliminates the step of plastic deformation of the ear and subsequent elastic deformation before being placed over the axle boot and combines two stations into one while requiring only that the finger members be so arranged that the ear is freely accessible by the pincer-like tool, for example, by arranging the finger members, rotated through 45° with respect to the 12 o'clock, 3 o'clock, 6 o'clock and 9 o'clock positions as shown in my aforementioned copending application.

The machine according to the present invention automatically carries out all the steps of the method in accordance with the present invention, thereby entailing further significant savings in labor costs while assuring high quality assembly in each instance with elimination of waste or scrap.

The method according to the present invention involves the steps of separating individual flat blanks from a number of flat blanks as delivered to the customer, feeding the same to the deformation station where it is deformed into circular shape, transferring the thus-deformed clamp to be placed over the axle boot and thereafter tightening the clamp over the axle boot by a pair of pneumatic pincers moving vertically as well as horizontally over the ear of the clamp to close the same with properly adjusted torque at the jaws of the tool.

BRIEF DESCRIPTION OF THE DRAWING

These and other objects, features and advantages of the present invention will become more apparent from the following description when taken in connection with the accompanying drawing which shows, for purposes of illustration only, one embodiment in accordance with the present invention, and wherein:

FIG. 4 is a partial cross-sectional view, through the separator device in accordance with the present invention, illustrating the gripping mechanism in its open position;

FIG. 5 is a partial cross-sectional view through the separator device, similar to FIG. 4, but illustrating the gripping mechanism in the gripping position;

FIG. 6 is a partial perspective view, illustrating the tripping mechanism to open the gripping mechanism at a predetermined point of rotation of the separator device;

FIG. 7 is a perspective view from the left rear of the feeding device in accordance with the present invention;

FIG. 8 is a somewhat schematic cross-sectional view illustrating the feeding device in its retracted position;

FIG. 9 is a somewhat schematic cross-sectional view, similar to FIG. 8, illustrating the feeding device in its extended position;

FIG. 16 is a side elevational view illustrating the reservoir and transfer mechanism to transfer the lowest blank in the reservoir to the deformation station;

FIG. 17 is an elevational view illustrating, on an enlarged scale, the gripping mechanism in the transfer mechanism;

FIG. 18 is a perspective view showing the parts of the gripping mechanism of FIG. 17 on a still further enlarged scale;

FIG. 19 is a perspective view of the type of clamp which can be used with the machine in accordance with the present invention;

FIG. 20 is a somewhat schematic top plan view on the deformation station, transfer station and fastening station of the machine in accordance with the present invention, illustrating the parts just after the clamp has been installed over an axle;

FIG. 21 is a somewhat schematic front elevational view of the deformation station of the machine according to the present invention;

FIG. 22 is a partial side elevational view, on an enlarged scale, taken in the direction of arrows XXII of FIG. 21;

FIG. 23 is a side elevational view of the machine in accordance with the present invention, illustrating the parts thereof at the deformation station and taken along line XXIII—XXIII of FIG. 21;

FIG. 24 is a somewhat schematic partial elevational view showing the position of the parts just before the ear reaches the noon position during deformation;

FIG. 25 is a somewhat schematic partial elevational view, illustrating the position of the parts in the course of the deformation operation when the ear has reached the noon position and just prior to rivet-like closing of the clamp;

FIG. 26 is a partial perspective view showing the locking action after completion of the deformation of the clamp;

DETAILED DESCRIPTION OF THE INVENTION

Figure 1:
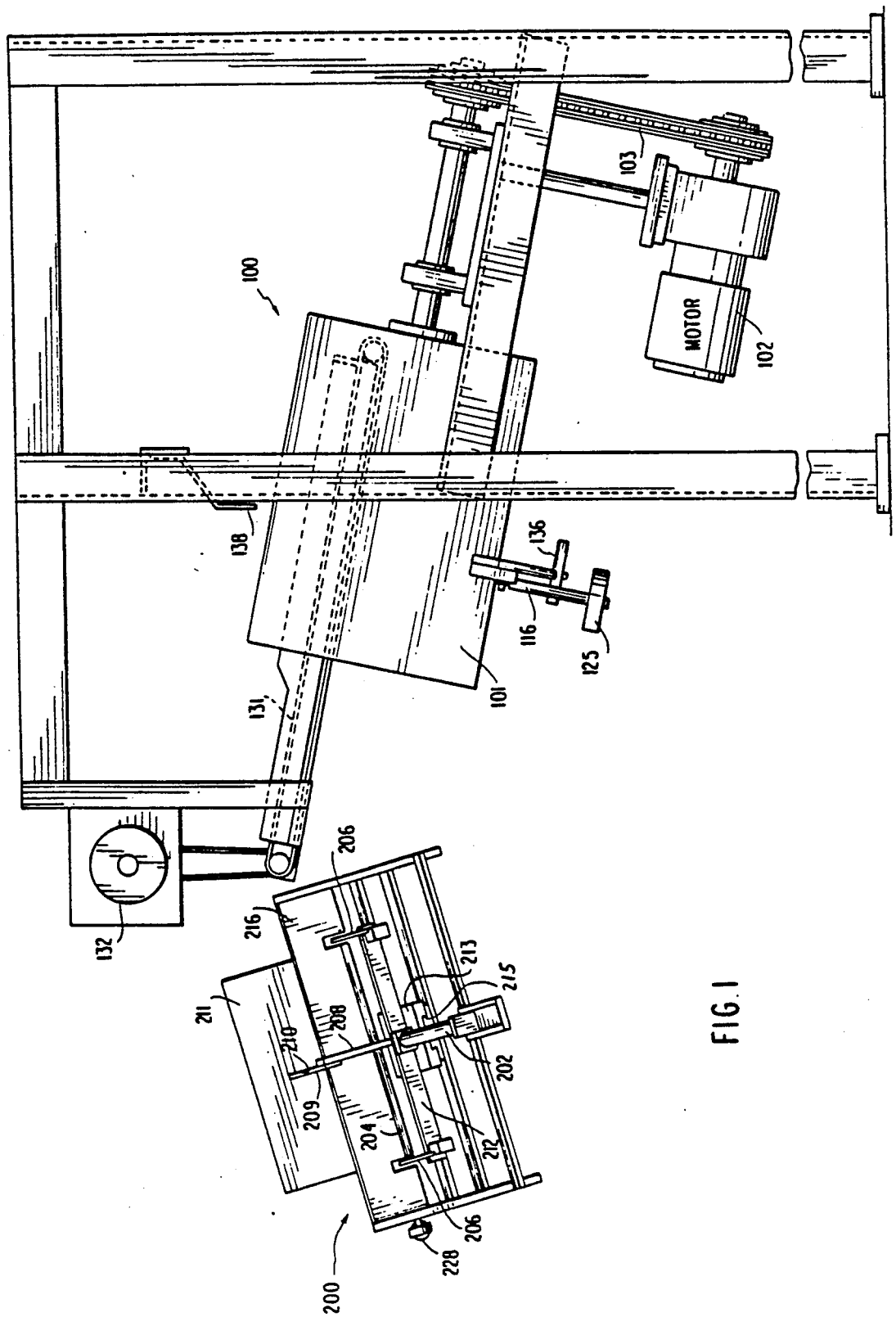
FIG. 1 is an elevational view of the separator device and feeding device in accordance with the present invention, taken in the direction of the feed of the flat separated blanks.

Referring now to the drawing wherein like reference numerals are used throughout the various views to designate like parts, and more particularly to FIG. 19, this figure illustrates a clamp of the type with which the machine of the present invention can be used. The clamp of FIG. 19, generally designated by reference numeral 10, consists of a flat clamping band 11 with a so-called "Oetiker" ear 12 which may include one or several reinforcing grooves 13 in the web portion of the ear. To assure a substantially gap-free and stepless transition in the circumferential direction from the inner band portion to the ring-like configuration of the clamp structure, the inner band portion 11a is provided at its free end with a tongue-like extension 14 which is adapted to engage in an aperture or complementary recess constituted by a bent-out embossment 15 provided in the outer band portion 11b, as more fully disclosed in my prior U.S. Pat. No. 4,299,012. Additionally, the inner band portion 11a is provided with one or more cold-deformed hooks 16 as well as with a guide hook 17 which may be a combined guide and support hook extending in the longitudinal direction as shown.

For reasons of economy, the clamp illustrated in FIG. 19 is shipped as a flat blank from the manufacturer to the customer who will deform the flat blank into circular shape and thereafter install the same over the object to be fastened, for example, at the assembly line. The flat blanks are thereby shipped in bundles of 100 or more so that, after removing the wire holding together the bundle, it is necessary to separate individual blanks from the number of blanks in a bundle and feed the same individually for deformation and subsequent installation on the object to be fastened.

The machine in accordance with the present invention includes at a separating station a separating device generally designated by reference numeral 100, at a feeding station a feeding device generally designated by reference numeral 200, at a deformation station a deformation machine generally designated by reference numeral 40, and a transfer mechanism generally designated by reference numeral 51 for transferring the closed clamp from the deformation machine to an axle boot where the clamp is tightened after being mounted over the axle boot. A reservoir generally designated by reference numeral 300 may be provided intermediate the feeding device and the deformation machine. For the sake of simplicity, only those parts necessary for an understanding of the present invention will be described in detail hereinafter, while those parts such as frame parts, the mounting of various parts on the frame and the like are not described and/or shown in detail.

The separator device generally designated by reference numeral 100 includes a drum 101 open at one end and rotated about its axis in the counterclockwise direction (FIG. 2) by a motor 102 (FIG. 1) drivingly connected with the drum 101, for example, by a sprocket chain 103. The drum 101 is rotatably mounted on the frame as shown in FIG. 1 with the motor also fixedly mounted thereon.

Figure 2:
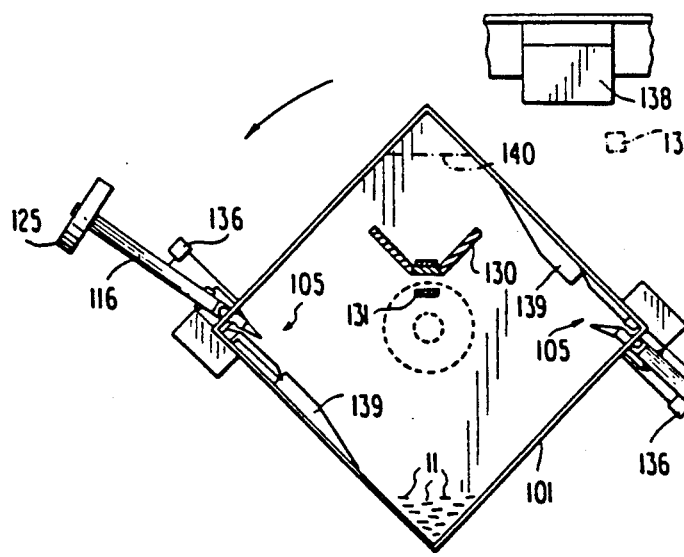
FIG. 2 is an elevational view of the separator device in accordance with the present invention, taken in the axial direction and from the open end thereof.
Figure 3:
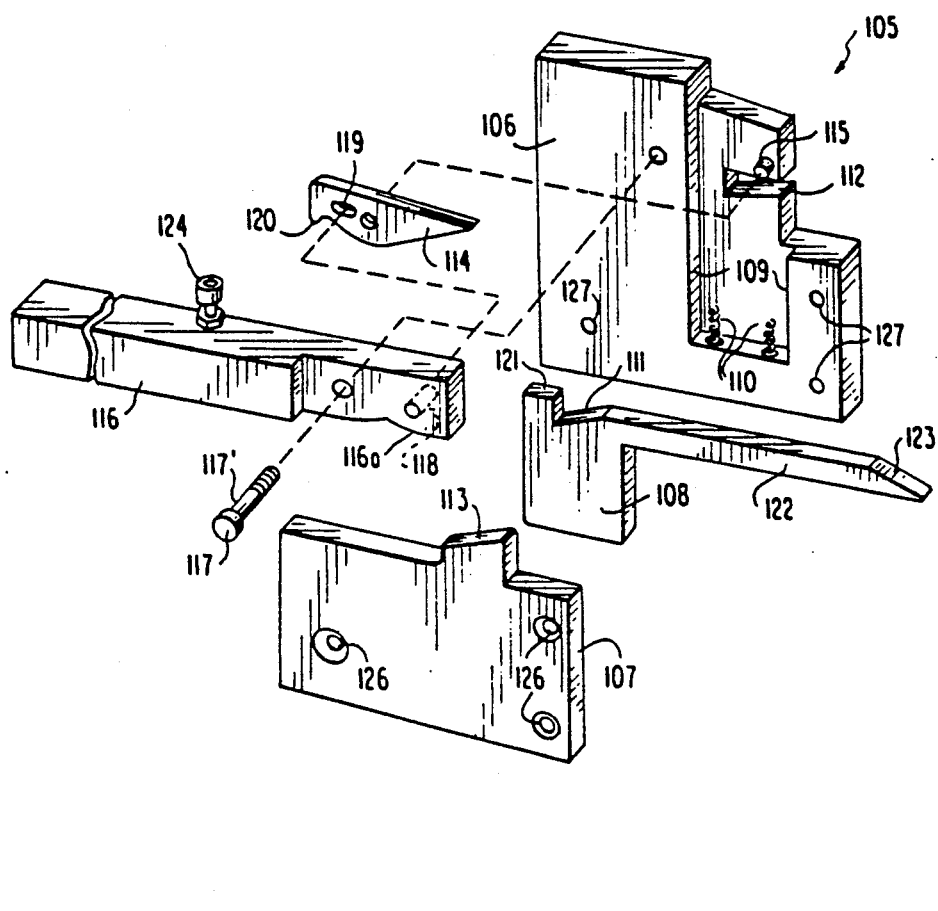
FIG. 3 is an exploded view, illustrating the gripping mechanism of the separator device in accordance with the present invention, on an enlarged scale.

In the illustrated embodiment, the drum 101 is of square configuration with two diagonally oppositely disposed, gravity-operated gripping mechanisms generally designated by reference numeral 105 (FIG. 2). Each gripping mechanism 105 consists of a base member 106 (FIG. 3), an auxiliary base member 107 accommodating therebetween a guide member 108 received for longitudinal movement in the milled-out recess 109 and spring-loaded by springs 110 into its normally upper position (FIG. 4). The inclined surface 111 on the guide member 108 is flush with the inclined surface 112 on base member 106 and with the inclined surface 113 on auxiliary base member 107 when the parts are in their normal position (FIG. 4) in which the gripping mechanism 105 is open to receive a flat blank in the thus-formed blank-receiving slot 128 which is so designed and dimensioned as to normally accommodate only one blank. The actuating member 114 is pivotally supported on the pin 115 provided on the base member 106. The actuating arm 116, in turn, is pivotally supported on base member 106 by a bolt or screw 117 having a bearing surface 117'. Pin 118 on the actuating arm 116 engages in elongated aperture 119 provided in actuating member 114 so that clockwise pivot movement of the actuating arm 116 causes the actuating member 114 to pivot counterclockwise whereby its rear pawl-like portion 120 depresses the guide member 108 by engagement with the latter's surface 121 as shown in FIG. 5 in which the gripping mechanism 105 is in its normal position as shown in FIG. 4 and the blank-receiving slot is opened. By contrast, when the gripping mechanism 105 is gravity-actuated, i.e., when in the position of the right gripping mechanism as shown in FIG. 2, any blank which had previously entered into the blank-receiving slot 128 is held clampingly fast between the clamping surface 116a at the end of the actuating arm 116 (FIG. 3) and the surface 113 of the auxiliary base member 107, as illustrated in FIG. 5.

A V-shaped guide trough 130 with a flat bottom extends into the drum in proper position to receive the separated blank as the drum approaches the 12 o'clock position. A conveyor 131 (FIG. 1) driven by motor 132 carries the released individual blanks to the feeding station. To assure proper release of the blank from the gripping action of the gripping mechanism, the separator device further includes a tripping mechanism generally designated by reference numeral 135 (FIG. 6), which includes a pivot member 136 pivotally supported on an end face of the support member 137 fixed at the drum 101 and adapted to engage during counterclockwise rotation of the drum 101 with the fixed tripping member 138, thereby causing clockwise rotation of the pivot member 136, as viewed in FIG. 6 and thereby pivoting of the arm 116 in the counterclockwise direction (FIG. 5) to open the gripping mechanism 105 and release the blank which, up to that point, had been held fast, into the trough 130.

The guide member 108 includes a relatively long nose portion 122 provided with a beveled entrance guide surface 123 so as to guide the individual blanks into the gripping mechanism. A set screw 124 permits adjustment of the extent of opening of the gripping mechanism. Holes 126 in auxiliary base member 107 and holes 127 in auxiliary base member 106 which are mutually aligned, serve for fastening the gripping mechanism 105 on the drum 101. The open blank-receiving slot 128 is shown in FIG. 4. Guide blocks 139 secured to the drum ahead of the gripping mechanisms 105 which are also provided with bevelled surfaces, are intended to assist in guiding an individual blank into the blank-receiving slot 128 of a respective gripping mechanism 105. In operation, as the drum rotates counterclockwise in FIG. 2, the blanks 11 which are located at the bottom of the drum 101 in FIG. 2, will move toward the gripping mechanism 105 as viewed in FIG. 2, whereby an individual blank will enter into the blank-receiving slot 128 appropriately dimensioned to permit free entry of a blank, but normally to preclude entry of other blanks once a blank has entered. At the same time as the right gripping mechanism 105 moves toward the 12 o'clock position, the tripping mechanism 135 is actuated as the pivot member 136 engages with the tripping member 138 to release the clamp carried by this gripping mechanism onto the upper conveyor part 131 in the trough 130.

After the drum has rotated through more than 90°, the left gripping member in FIG. 2 will approach the position previously held by the right gripping member in FIG. 2 so that the gravity-operated actuating arm 116 becomes effective to close the gripping mechanism 105 and thereby carry the blank gripped thereby until it is released onto the conveyor 131. It can thus be seen that the separator device 100 is simple in construction with the opening and closing of the gripping mechanism effected by gravity actuation. Notwithstanding its simplicity, however, the separator device 100 according to the present invention has proved highly reliable in operation. As a precautionary measure, a small triangular anti-wedging member 140 (FIG. 2) may be provided which prevents that any blanks become stuck by wedging action in the corners. For the sake of convenience, the anti-wedging member 140 is shown in FIG. 2, displaced by 90° from its actual position in the drum, i.e., in a respective corner containing a gripping mechanism. The anti-wedging member 140 is thereby fastened at the bottom of the drum in the respective corner while the gripping mechanism 105 is located more or less in the center area of the drum as viewed in the axial direction thereof.

The drum 101 may be manually filled as needed, by an operator attending several machines. However, the drum may also be refilled automatically from a central reservoir to which several machines are connected. The refilling can be readily automated, for example, by the use of a counter counting the number of blanks separated in the separator device or installed on the assembly line and by the use of conventional electronic controls in connection with appropriate feed devices. Moreover, the contents of the trough 130 may also be automatically returned to the drum 101 by any known means.

Figure 13:
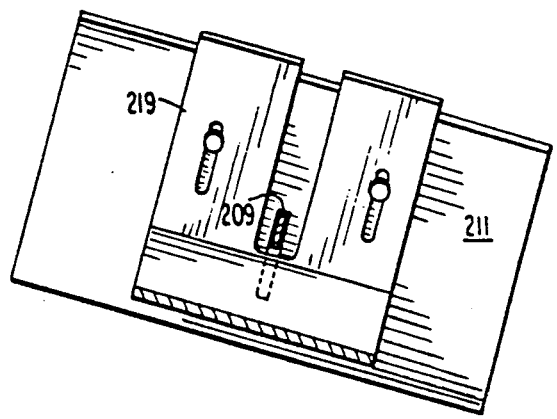
FIG. 13 is a somewhat schematic cross-sectional view taken along line XIII—XIII of FIG. 9.

The blanks separated by the separator device 100 are carried by the conveyor 131 to be delivered to the feeding station where the blank arrives in its feeding position on the transverse support member 204 in a space delimited between the forward stop plate 211 and the rear stop plate 216. The movable feed assembly generally designated by reference numeral 205 includes longitudinal feed arms 206 pivotally supported on transverse member 207 which carries in its center an upright member 208 supporting the longitudinally extending actuating arm 209 having a bevelled engaging surface 209' which is adapted to engage in slot 210 of the stop plate 211 to raise the same from the position shown in FIG. 8 into the position shown in FIG. 9 as the movable feed assembly 205 is extended by pneumatic cylinder 202 whose piston rod 203 is connected with the transverse member 212, itself connected with the transverse member 207 by the central plate-like base member 213 guided for reciprocating movement on the fixed support 214 by the dovetail guide arrangement 215 (FIGS. 1 and 7). Thus, the parts 212, 213, 207, 208, 209 and 206 partake in the reciprocating motions, with the feed arms 206 additionally able to pivot about its pivotal connection at the transverse member 207, as will be described more fully hereinafter. To enable pivotal movement, the transverse member 212 is provided with guide slots in its outer areas which permit the pivotal movement of the arms 206. The forward part of the feed arms 206, which engage with the blank are provided with a step 217 along the forward free edge and with a V-shaped notch 218 provided in the lower vertical end face thereof. A fixed support member 219 carries the forward stop plate 211 which, to enable relative movement between these two parts, is provided with pins engaging in elongated openings of the support member 219 (FIG. 13). The transverse member 204 is adjoined in the direction of the feed movement of the blanks by a spring-loaded support member 221 forming the lower surface of the inlet to the guide path generally designated by reference numeral 220 in which the blank during its feed movement is frictionally guided to the reservoir station, to be described more fully hereinafter.

Figure 11:
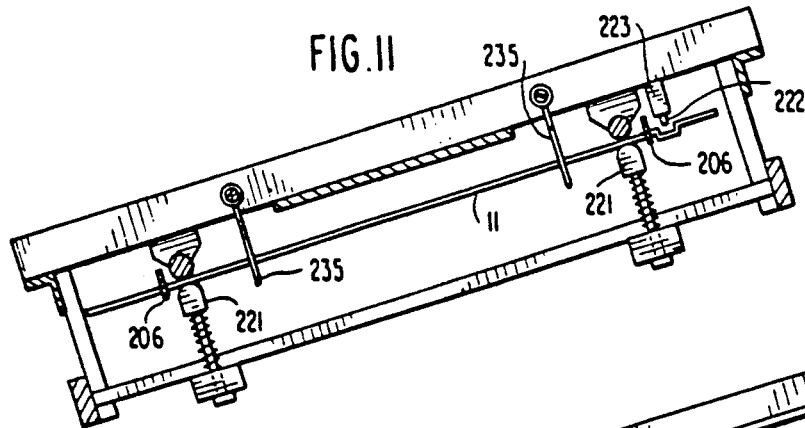
FIG. 11 is a somewhat schematic view, taken along line XI—XI of FIG. 8.
Figure 12:
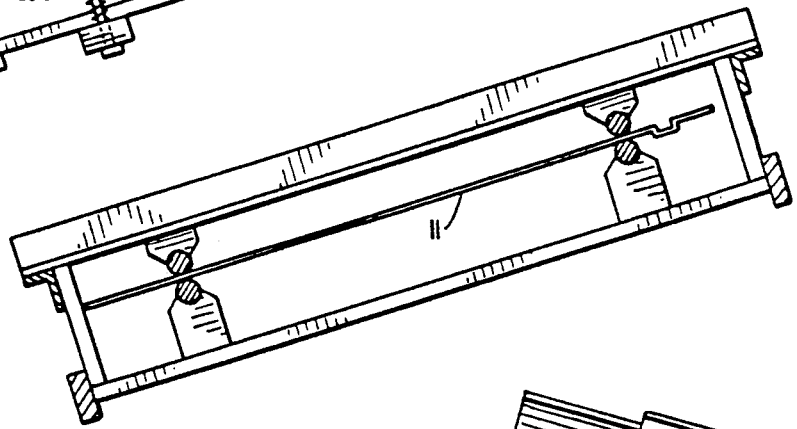
FIG. 12 is a somewhat schematic cross-sectional view, taken along line XII—XII of FIG. 8.
Figure 14:
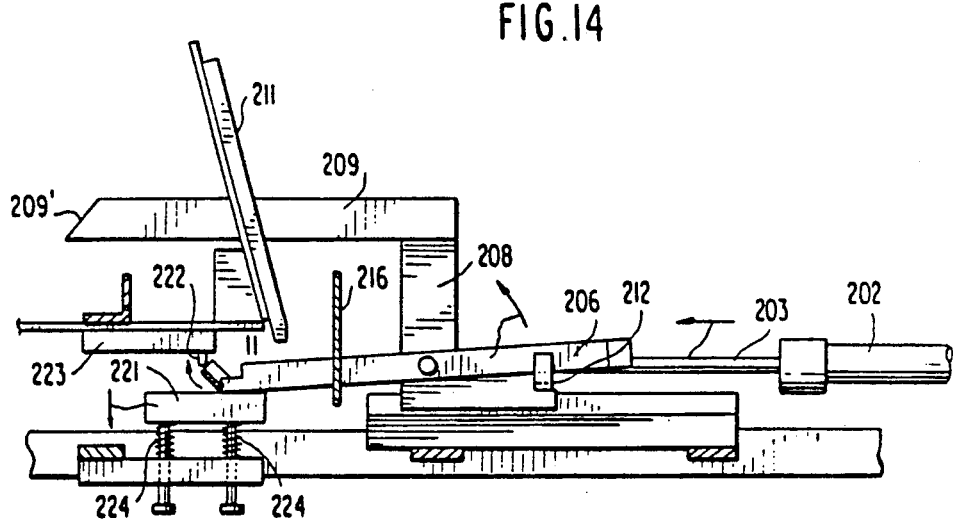
FIG. 14 is a somewhat schematic side elevational view, similar to FIG. 9, and illustrating the position of the parts of the feed device when the blank is in a position 180° from the desired position.

The normal position of the blank 11 on the transverse member 204 in the feed mechanism is with the ear facing down (FIGS. 11 and 12). However, it may happen that the blank lands on the transverse member 204 with the ear facing up. A pin 222 (FIGS. 11 and 14) carried by the fixed support member 223 engages the upwardly turned ear as the arms 206 seek to move the blank in the feed direction, thereby causing the blank to be turned over into the correct position as shown in FIG. 14. To prevent jamming, the member 221 is spring-loaded so as to be able to yield in the downward direction, as indicated by the arrow in FIG. 14.

Figure 10:
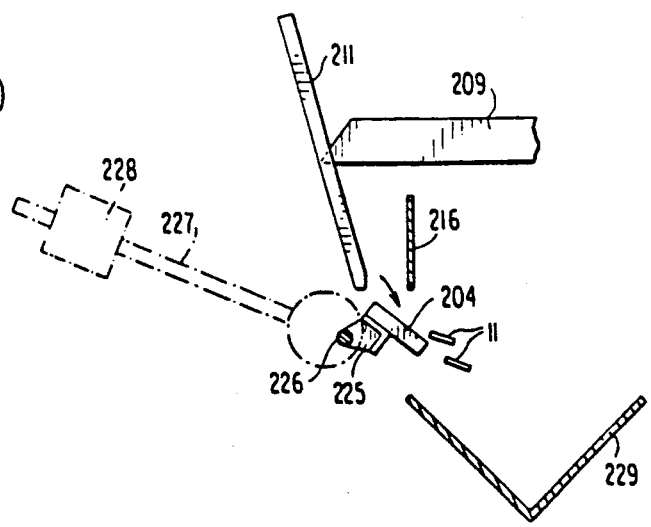
FIG. 10 is a somewhat schematic view illustrating the scale-like ejection mechanism to detect the presence of more than one blank in the feeding position and for ejecting the same.

The present invention also provides a mechanism which rejects the presence of more than one blank on the transverse member 204. It may happen, though rarely, that two blanks have become stuck together as delivered from the manufacturer and as subsequently transferred by the separator device 100 to the feeding device 200. For that reason, the transverse member 204 is carried by a bracket 225 itself mounted on pivot shaft 226. A balance arm 227 (FIGS. 7 and 10) carries an adjustable weight 228. The assembly constituted by the parts 204, 225, 226, 227 and 228 forms a highly sensitive scale, which pivots in a trap-door-like fashion to eject the two blanks 11 into a bin or reservoir 229 (FIG. 10) when more than one blank is present in the feed position on the transverse member 204. A sensor 230 (FIGS. 7 and 8) cooperating with the part 231 thereby detects the presence of a blank and actuates with delay the pneumatic cylinder 202 to feed the blank. Therefore, in the absence of a blank, the pneumatic cylinder will not be actuated at all until a blank is again detected by the sensor 230.

In operation, as the pneumatic cylinder 202 is actuated to advance the movable feed assembly 205 in the feed direction, i.e., toward the left in FIG. 8, the bevelled surface 209' of the actuating member 209 will engage in slot 210 and cause, by camming action, to lift the stop plate 211 from its position shown in FIG. 8 into the position shown in FIG. 9 to permit the blank 11 to be displaced in the feed direction by engagement of the V-shaped notches 218 with the blank 11 to positively feed the blank into the guide path 220 where it is frictionally guided to the reservoir station. This assumes that the ear on the blank is in its normal position, i.e., its ear faces downwardly. If, however, the blank is in a position on the transverse member 204 with the ear facing upwardly, then in the course of the feed movement, the ear will engage the pin 222 and continued movement of the feed arms 206 toward the left, as viewed in FIG. 14, will cause the feed arms 206 to pivot slightly in the counterclockwise direction about their pivotal connection with the transverse member 207 while at the same time causing the support member 221 to be displaced downwardly against the force of the springs 224 in order to permit the blank to be turned through 180° into correct position with the ear facing downwardly.

If two blanks are present on the transverse member 204, the weight thereof will cause the scale-like ejection mechanism to operate (FIG. 14) to eject the two blanks into the reservoir or bin 229 from which the blanks can be either manually or automatically fed back to the separator device 100. Springs 235 (FIGS. 8 and 11) prevent the return of any blank in a direction opposite to the feed direction.

The guide path 220 which at its end nearest the feeding device 200 has an inclination opposite to that of the inclination of the separator device 100, is gradually brought into horizontal position before it reaches the curved portion 232 (FIG. 16) leading into the reservoir station R. The frictional engagement also terminates prior to reaching the bend 232 so that the blanks can fall freely into the vertical reservoir generally designated by reference numeral 300, once they approach the bend 232. The reservoir 300 includes an upper sensor 301 which detects when the reservoir is full to de-energize the motor 102 of the separator device which, like the feeding device 200, operates at a cyclic rate greater than that of the remainder of the machine so that more blanks are separated and fed into the reservoir 300 when the separator device 100 and the feeding device 200 operate, than would be required on the assembly line. The lower sensor 302 detects the condition of the reservoir when the latter nears empty condition so as to re-activate the separator device and feed mechanism to refill the reservoir 300.

Two control pins (not shown) are provided on the left side of the reservoir, as viewed in FIG. 16, to control the flow of the blanks into the pick-up position. Normally, the upper pin holds the lowest blank by friction. When the pick-up mechanism is in position and a signal is received from the assembly line, the upper pin is retracted and the lower pin is extended so as to permit the lowest blank to drop into position to be grabbed by the pick-up mechanism. As the pick-up mechanism is about to pick-up the lowest blank, the upper pin is again moved out and the lower pin is retracted so as to hold the blanks in the reservoir for the next cycle of operation. As the parts used for controlling the orderly movement of the blanks in the reservoir and the controls therefor involve commercially available parts, a detailed showing thereof is dispensed with herein for the sake of simplicity.

Figure 15:
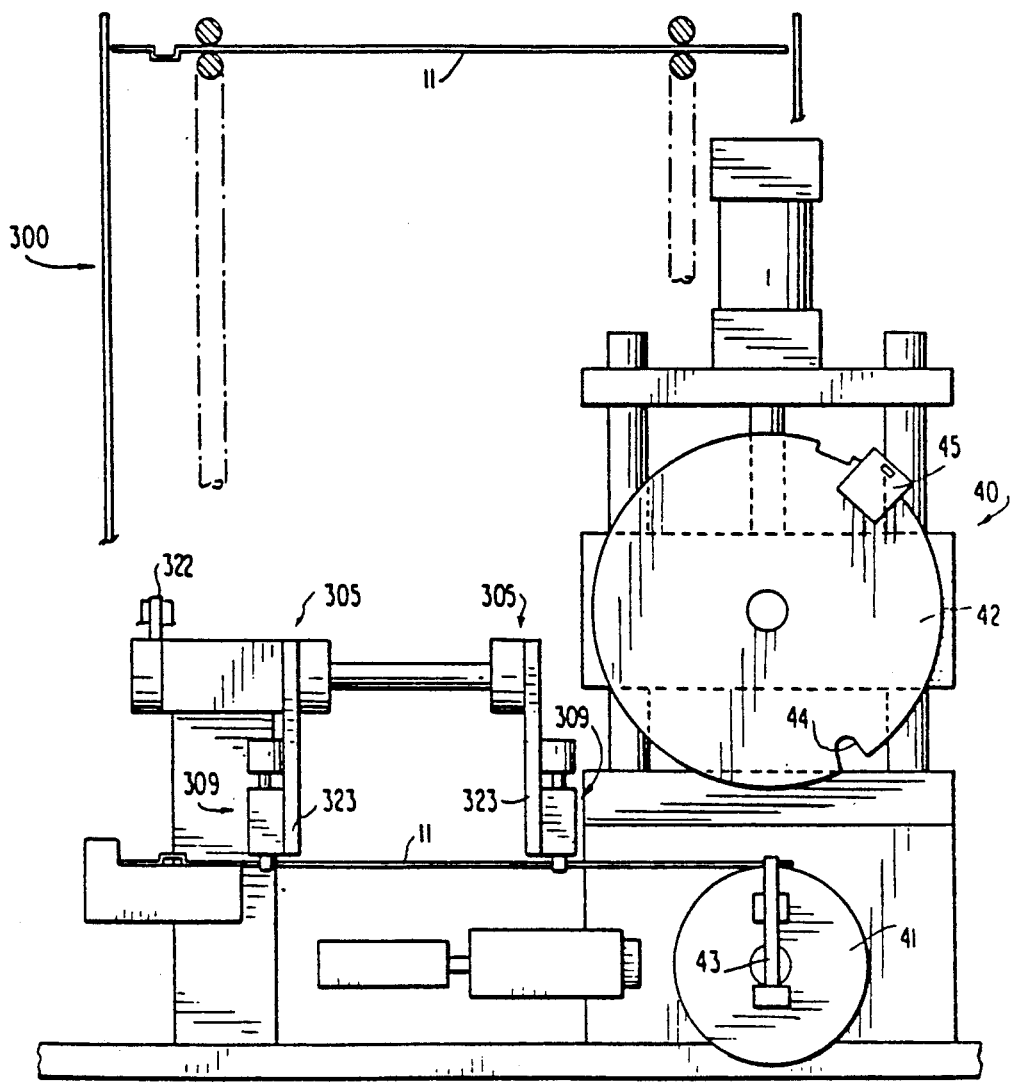
FIG. 15 is an elevational view on the reservoir and deformation station, taken along line XV—XV of FIG. 16.
Figure 27:
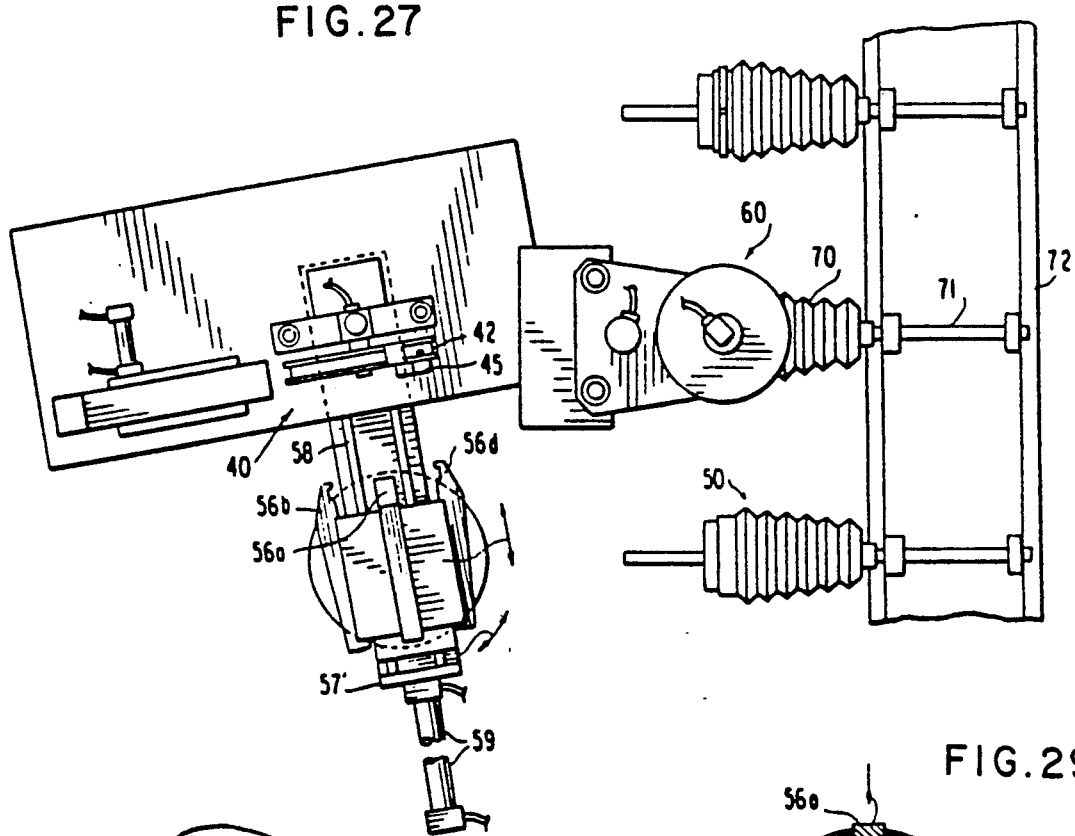
FIG. 27 is a top plan view on the machine, similar to FIG. 20, illustrating the position of the various parts after the axle together with axle boot and clamp mounted over the same have been moved to the fastening station and the transfer mechanism is again in alignment with the deformation station.

To assure that the blank is always bent slightly convexly to facilitate pick-up thereof by the pick-up mechanism generally designated by reference numeral 305, a center push-pin is provided which is energized shortly before the grippers of the pick-up mechanism pick-up the blank and which is de-energized again shortly after the grippers have picked up the blank. A pneumatic cylinder 306 is operatively connected with a cam (not shown) in the box 307 to actuate the two control pins controlling the orderly movement of the blanks in the reservoir. Two such control boxes 307 are provided near the outer ends of the blank, in a location similar to the parts forming the guide path shown in FIG. 12, with another box separately actuated in between these boxes 307 located within the center area of the blank and containing the push-pin and its actuating mechanism. The pick-up mechanism 305 picks up the blanks in proper position in the reservoir and after rotation through about 90° places the same into position for further processing at the deformation station. Two pick-up mechanisms 305 are provided (FIG. 15), each of which includes a pair of cooperating gripping members 310 (FIGS. 17 and 18) which can be extended and retracted by actuation with the use of a pneumatic actuating device 311 (FIG. 16). The exposed edges of the gripping members 310 which cooperate are so shaped as to provide cooperating undercut surfaces forming jaws capable of securely gripping a blank, as illustrated in FIG. 17 in dash and dotted lines. The gripping members are spring-loaded into a retracted position by springs 312 and are guided in slanting guide slots 313a and 313b as well as guide slots 314a and 314b provided in the two complementary housing parts 315 and 316 which accommodate therebetween the gripping members 310. In FIG. 18, the housing part 316 is shown rotated through 90° although in actuality, it extends parallel to the housing part 315. An actuating member 317 is thereby connected with the pneumatic actuating device 311 to cause extension of the gripping members 310 which at the same time causes closing of the jaws 310' thereof by engagement of the slanted raised portions 318a, 318b (not shown) and 319a, 319b in slots 313a, 314a and 313b and 314b.

The pick-up mechanism 305 further includes a pneumatic cylinder 320 whose piston rod 321 is operatively connected with the bracket 322 so as to cause rotation of the pick-up arm mechanism and, more particularly, of the support members 323 carrying the gripping mechanisms 309.

In operation, the lowest blank is permitted to descend in the reservoir station into position where it can be picked up by the gripping mechanism 309 of the pick-up mechanism 305. The blank is grabbed by the gripping members 310 by actuation of the latter into the extended position by activation of pneumatic device 311. Thereafter, the cylinder 320 is activated to rotate the thus picked-up blank through 90° to be deposited at the deformation station. The descent of the blanks is thereby controlled by two control pins spaced apart the width of a blank which frictionally engage the blanks and operate in the manner described above.

The deformation station generally designated by reference numeral 40 (FIGS. 20, 21, 23, 27, 28) which includes a first smaller roller member 41 and a second larger roller member 42 which are adapted to rotate about their respective axes of rotation and are so spaced as to cause feed of the flat blank 10 when it is inserted into the deformation station D by the pick-up mechanism 305 and triggers a proximity switch (not shown) of conventional construction as will be described more fully hereinafter. The smaller roller member 41 includes a pair of approximately L-shaped clamping members 43 which, when actuated, are adapted to move first radially outwardly over the inserted clamping band 11 and thereafter toward one another with their clamping legs so as to hold the flat blank onto the outer surface of the roller member 41 (FIG. 22). The larger roller member 42 includes a first notch 44 of a shape to permit the clamping members to close over the clamping band at the beginning of the clamping operation and a second notch 44' of a shape complementary to the ear 12 and so spaced along its circumference as to accommodate the ear when it arrives in the noon position of the clamp after a complete rotation of the roller member 41. The larger roller member 42 includes a locking member 45 so positioned and arranged with its camming surface or a slot 45' (FIG. 25) as to cause engagement with the projecting end of the combined guide and support hook 17 in order to provide a positive locking action to hold the clamp closed.

The transfer mechanism TM generally designated by reference numeral 51 (FIG. 32) includes a pick-up mechanism 55 having four finger-like, approximately L-shaped gripping fingers 56a, 56b, 56c and 56d arranged in two mutually opposite pairs in the noon, 3:00 o'clock, 6:00 o'clock and 9:00 o'clock positions relative to the deformed clamp. The gripping finger 56a in the noon position which is intended to engage the outer clamp surface within the area of the ear 12 is thereby provided with a recess complementary to the shape of the ear so as to accommodate the same therein. The finger members 56a–56d are pivotally supported on the pick-up mechanism 55 by conventional means so as to permit selective closing and opening of the gripping fingers to pick-up a clamp and release the same again. Additionally, the control for the closing and opening of the finger-like members is thereby made in such a manner that they can be actuated selectively in a pair 56a, 56c and 56b, 56d to perform the plastic deformation and elastic deformation as will be described more fully hereinafter.

Figure 32:
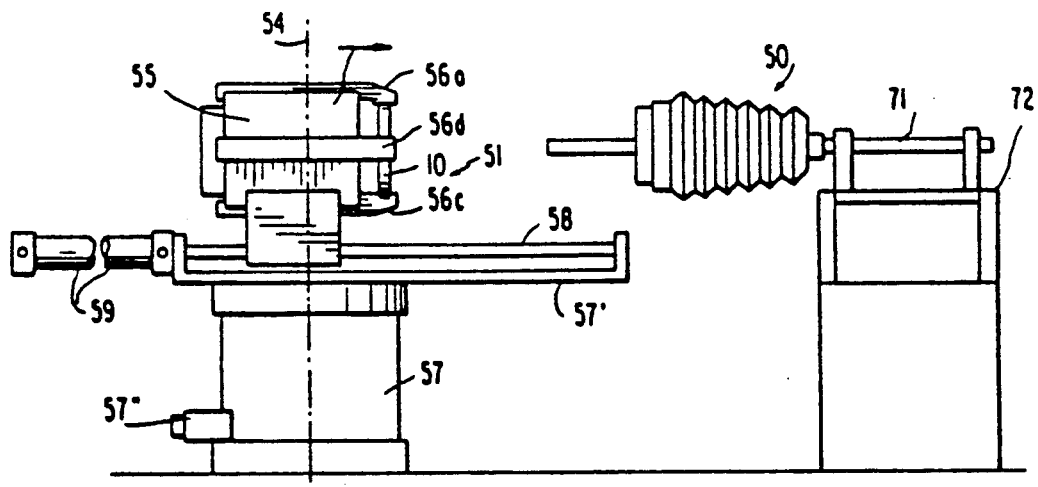
FIG. 32 is a somewhat schematic elevational view illustrating the parts of the machine with the transfer mechanism aligned with the next axle boot and showing the clamp held by the gripping fingers.

The pick-up mechanism 55 is rotatably supported about an axis 54 (FIG. 32) on a relatively fixed support structure 57, the rotation being imparted by conventional means schematically indicated in FIG. 32 by motor 58 which may be drivingly connected by gears or the like with the pick-up mechanism 55. Two support rods 58 serve as guidance for the reciprocating movement of the pick-up mechanism 55 during reciprocating movement in the horizontal direction, as controlled, for example, by the pneumatic cylinder 59 (FIG. 32). The support rods 58 are supported in the U-shaped frame member 57' itself rotatably mounted on the support structure 57 for rotation about the axis 54.

Figure 33:
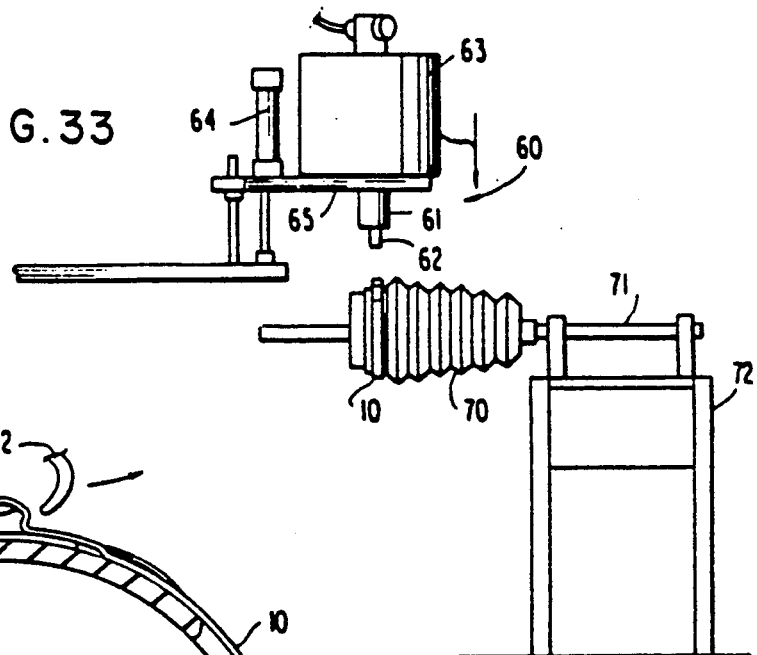
FIG. 33 is a schematic view illustrating the position of the parts at the fastening station just prior to the application of the pneumatic pincer-like tool.
Figure 34:
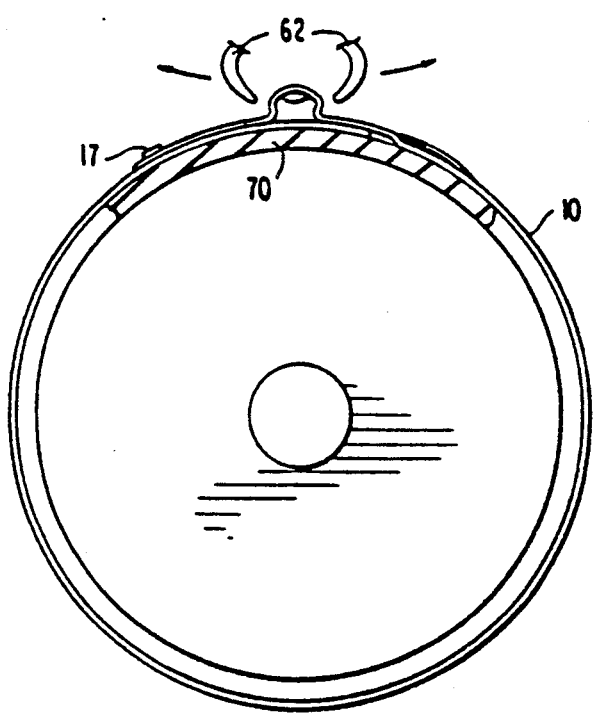
FIG. 34 is a somewhat schematic view illustrating the position of the parts after the ear has been plastically deformed to tighten the clamp onto the axle boot with a predetermined force.

The fastening station generally designated by reference numeral 60 (FIG. 35) includes a pneumatic pincer-like tool 61 having pivotally mounted jaws 62 (FIGS. 33 and 34) for plastically deforming the ear 12 to tighten the axle boot 70 onto the axle structure 71 as it is moved along the assembly line 72 (FIGS. 20 and 33). The pneumatic tool 61 includes a control box 63 (FIG. 33) to adjust the speed with which the jaws 62 close and the maximum force with which the clamp is tightened. Additionally, the cycle rate can also be adjusted. FIG. 17 is a schematic diagram showing an electronic circuit which may be contained in the control box 63.

A pneumatic cylinder 64 (FIG. 33) thereby displaces the pneumatic tool assembly 61, 63 and its support 65 in the vertical direction so as to place the jaws 62 accurately over the ear to be deformed. A conventional sensor (not shown) thereby initiates displacement of the pneumatic tool at the right time in relation to the cyclic operation of the machine. Of course, if necessary, appropriate means may also be provided to move the tool, in addition to being moved in the vertical direction, in a horizontal plane, if this should prove necessary.

OPERATION

The operation of the machine in accordance with the present invention is as follows.

The separator device and feeding device operate as described in detail above. Assuming that no blank has been deposited as yet by the pick-up mechanism 305 in the deformation station, the upper roller member 42 is spaced from the lower roller member 41 as shown in FIGS. 21 and 23. As soon as a flat blank is fed into the deformation station D, a sensor (not shown) of conventional construction will start the cycle of operation. At that time, the clamping members 43 are still in their retracted position, and the pick-up mechanism 55 faces and is in alignment with the deformation station 40. Initially, the roller member 42 is rotated a slight amount in the clockwise direction as it approaches the roller member 41 so that its notch 44 is in position at the correct time to permit the clamping members to move over the clamping band as shown in dash-and-dotted lines. As the roller member 41 rotates in the clockwise direction and the roller member 42 in the counterclockwise direction, the flat blank is fed into the machine. The clamping members 43 when actuated, hold the leading edge of the clamping band onto the outer surface of the roller member 41 so as to deform the clamping band as the feed movement continues by rotation of the roller members 41 and 42. The arrangement is thereby made in such a manner that the clamping members 43 engage the clamping band at a point where the full width of the clamping band starts at its leading edge, i.e., behind the tongue-like extension so that the tongue-like extension remains substantially in its original shape, e.g., rectilinear or slightly bent until it engages with the outer band portion 11b as the roller member 41 continues to rotate. This offers the advantage that the tongue-like extension is deformed only as it engages in the recess 15 in the outer band portion 11b so that there is sufficient elasticity in the tongue-like extension to assure secure engagement thereof in the recess 15.

Figure 28:
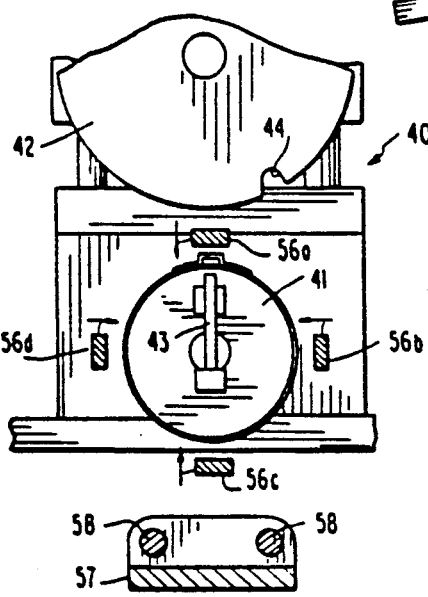
FIG. 28 is a partial, somewhat schematic cross-sectional view, illustrating the parts at the deformation station after completion of the deformation operation and just prior to pick-up of the deformed clamp by the transfer mechanism.

The diameter of the parts and location of the second notch 44' are so arranged that the notch 44' will be in a position to receive the ear 12 after the roller member 41 has completed a full revolution. The further rotation of the roller members 41 and 42 causes the locking member 45 to engage with the combined guide and support hook 17 to positively lock the clamp in its closed condition by rivet-like action. This takes place with the ear 12 rotated beyond the noon position so that after completion of the locking action, the roller members 41 and 42 are rotated back through more than 360° to their earlier position in which the ear 12 is in the noon position. The roller member 42 will thereafter be withdrawn from engagement with the clamp so that the latter can slightly expand due to its elasticity and can thus be withdrawn from the deformation station. To this end, the pick-up mechanism 55 had been moved toward the deformation station so that the finger members 56a-56d are now in position to engage the outer surface of the deformed clamp as schematically indicated in FIG. 28 where the arrows indicate the pivot movement of these finger members to engage with the deformed clamp. Next, the pick-up mechanism 55 will be retracted, is thereafter rotated until aligned with the transfer station 50 whereupon the pick-up mechanism 55 is again displaced toward the transfer station in such a manner that the clamp is now over the axle boot, ready to be released by disengagement of the finger members 56a-56d.

Figure 29:
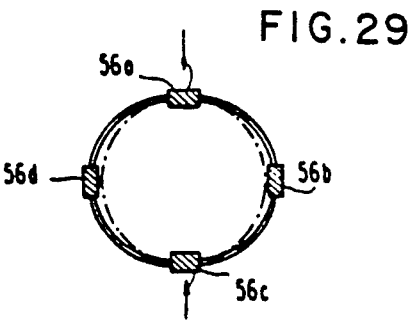
FIG. 29 schematically illustrates the plastic deformation of the circular clamp into non-circular configuration in the course of the transfer from the deformation station to the transfer station.
Figure 30:
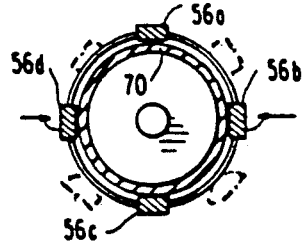
FIG. 30 is a somewhat schematic view illustrating the elastic deformation of the clamp into its substantially circular shape just prior to being mounted over the axle boot.
Figure 31:
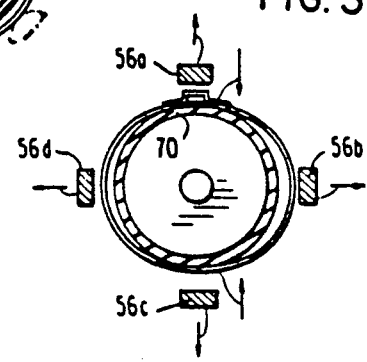
FIG. 31 illustrates the position of the clamp on the axle boot after release by the pick-up finger members, the oval shape of the clamp being illustrated in an exaggerated manner.

As it is important that the ear 12 always remains in a predetermined position as the axle assembly moves from the transfer station 50 to the fastening station 60, the present invention also performs two further operations in the course of the transfer of the clamp from the deformation station 40 to the transfer station 50. More particularly, the clamp is plastically deformed into a slightly oval configuration by applying a deformation force to the clamp by way of the finger members 56a and 56c, schematically illustrated in FIG. 29 by the arrow where the non-circular configuration of the clamp is shown in an exaggerated manner. FIG. 30 illustrates how the clamp structure is again deformed into substantially circular shape though only elastically by the application of a force thereto by the finger members 56b and 56d, schematically indicated in FIG. 30 by the arrows. The clamp is then held in frictional engagement with the axle boot 70 as a result of its tendency to return to the non-circular configuration after being released by the finger members 56a-56d as shown again in an exaggerated manner in FIG. 31.

The thus-assembled axle boot and clamp structure is then moved from the transfer station 50 to the fastening station 60 where the pincer-like tool 61 is lowered so that the jaws 62 can engage with the ear 12, held in fixed position relative to the axle boot 70 and thereby assuring every time a completely accurate contraction of the ear and therewith completely satisfactory installation of the clamp structure.

After the clamp is released by the finger members 56a-56d, the pick-up mechanism 55 is again moved away from the transfer station 50, thereafter rotated and aligned with the deformation station in a position ready to pick up the next deformed clamp (FIG. 27) after the next cycle of operation.

As the actuating and drive mechanisms as well as the controls therefore to cause the various movements of the parts of the machine of the present invention, to the extent not shown herein, are known as such, utilizing commercially available and known arrangements, a detailed description thereof is dispensed with herein for the sake of clarity.

Though on the assembly line the axle and axle boot are normally brought into position at the transfer station, are held thereat for a predetermined time, for example, six seconds to permit installation of the clamp and are thereafter moved together with the clamp to the fastening station where the assembly of axle boot and clamp are now held for six seconds to permit contraction of the clamp ear, the present invention is not limited to an intermittently operable assembly line, but can also be used with a continuously moving assembly line by providing appropriate movements of the various parts at the speed of the assembly line. For example, the pick-up mechanism as also the tool may move at a speed and in a direction of the movement of the assembly line to permit installation of the clamp on a continuously movable assembly line.

Furthermore, the present invention is not limited to a clamp provided with an ear, but may also be used, for example, with an earless clamp of the type disclosed in my prior U.S. Pat. No. 4,492,004. All that is necessary is to predesign the roller member 42 to accommodate the various projecting parts and to redesign the pneumatic tool 60 to provide proper closing action of the clamp.

According to the present invention, further simplification of the machine is possible by eliminating the fastening station and combining the same with the transfer station. This can be done by holding the clamp by the fingers 56a-56d in position on the axle boot while the pincer-like tool is brought into engagement with the ear to be contracted so as to tighten the clamp on the axle boot. All that is necessary is to relocate the fingers 56a-56d by displacing the same through about 45° as shown in dash and dot lines in FIG. 30.

Furthermore, it is also possible to modify the machine by stamping the blank as it is in position at the deformation station prior to the beginning of a deformation cycle. This simplifies the control for the stamping operation and its movements.

Additionally, the separator device 100 need not be in the form of a square drum but may be of some other polygonal shape. Furthermore, the number of gripping mechanisms can be varied, for example, with one gripping mechanism in each corner of the drum.

Finally, it is also possible to eliminate an extended guide path by arranging the feed mechanism substantially horizontally and locating the end of it close to the bend 232 so that the clamps are positively fed already at the feed station in a horizontal position.

Thus, while I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A method of automatically installing and fastening a clamp made from a flat blank onto an object of predetermined configuration, comprising the steps of separating individual blanks from a supply of similarly oriented blanks, feeding the thus-separated individual blank to a deformation station, deforming the flat blank into a clamp having an internal configuration slightly larger than the configuration of the object, picking-up with the use of a transfer mechanism the thus-deformed clamp from the deformation station and transferring it to the object to be fastened where it is placed over the object, and thereafter tightening the clamp over the object to be fastened.

2. A method according to claim 1, further comprising the steps of plastically deforming the clamp during transfer from the deformation station to the object to be fastened into a shape slightly different from that of the configuration of the object and thereafter elastically deforming the clamp again into its original configuration before being released over the object to be fastened so that the clamp is retained on the object in predetermined position by frictional engagement with the object until the clamp is tightened on the object.

3. A method according to claim 1, wherein the clamp is held in position over the object to be fastened by the transfer mechanism at least until the tightening operation has commenced.

4. A method according to claim 1, wherein the operation of the machine is synchronized with an assembly line transporting the object to be fastened.

5. A separating device comprising a rotatably mounted polygonal drum means open at one end and closed at the other for receiving a supply of flat blanks oriented in the same direction, gripping means mounted in said drum means near a respective corner thereof for rotation with the drum means and operable to grip an individual blank after the gripping means has passed through its lower point during rotation of the drum means, tripping means for releasing the gripping action of said gripping means as it approaches its highest point to release the blank carried along by said gripping means for removal out of said drum means.

6. A separating device according to claim 5, further comprising conveyor means for transporting the released blank to said second means.

7. A separating device according to claim 5, wherein said gripping means effectively form jaws which provide a normally open blank-receiving slot, and gravity-operated means for closing said blank-receiving slot and thereby holding fast a blank received therein as the gripping means is being raised during rotation of the drum means.

8. A separating device according to claim 7, wherein said gripping means includes an actuating arm pivotally mounted on a relatively fixed part of the gripping means and provided with a clamping surface, an actuating member pivotally mounted on said relatively fixed part and pivotally connected with said actuating arm so as to pivot in a direction opposite to that of the actuating arm when actuated by the latter, said blank-receiving slot in its open condition being formed by a guide surface of said actuating member on one side and at lest in part by the relatively fixed part on the opposite side, and said blank-receiving slot being closed to provide a clamping action by pivot movement of the actuating arm and therewith also of the actuating member so as to move the guide surface of said actuating member away from the relatively fixed part and bring the clamping surface of said actuating arm into its clamping position.

9. A separating device according to claim 8, wherein said relatively fixed part is provided with a recess open in the direction of the blank-receiving slot for slidably receiving therein a spring-loaded guide member having a nose portion, and wherein said actuating member is in operative engagement with said guide member to displace the latter against spring action when said actuating member is pivoted by said actuating arm.

10. A separating device according to claim 9, wherein said gravity-operated means includes a weight on said actuating arm.

11. A feed mechanism for feeding individual flat blanks in proper position for further processing, comprising relatively fixed support means, a movable feed assembly reciprocably guided on said fixed support means, said movable feed assembly including longitudinally and transversely extending members fixedly interconnected into said feed assembly and two longitudinally extending feed arms pivotally connected with said feed assembly so as to move in unison therewith during reciprocating movement while enabling pivotal movement relative thereto, the free ends of said feed arms being operable to engage with a flat blank in its feed position, a plate-like stop member delimiting the feed position and normally precluding movement of the blank in the feed direction, said feed assembly being provided with release means for lifting the stop member during movement of the feed assembly in the feed direction, and further means for automatically turning the blank around by the feed movement of the feed assembly when the blank is in an inverted position, 12. A feed mechanism according to claim 11, wherein said release means includes a longitudinally extending member on said feed assembly which engages with its bevelled front surface in a complementary slot in the stop member to lift the latter.

13. A feed mechanism according to claim 12, further comprising gravity-actuated scale-like means for determining the presence of more than one blank in the feed position and for ejecting the same.

14. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, reservoir means between said second and third means for storing a number of flat blanks for subsequent use in the deformation station, and pick-up means for picking-up the lowest blank in said reservoir means and placing it into position for further processing by said third means.

15. A machine according to claim 14, further comprising frictional means for normally holding the lowest blank in the reservoir means and for permitting the lowest blank to drop into pick-up position while holding the remaining stack of blanks.

16. A machine according to claim 15, further comprising means for convexly bending the blank in its pick-up position to facilitate pick-up thereof.

17. A machine which has a predetermined cyclic speed of operation according to claim 14, wherein said first and second means are operable at a cyclic speed greater than the cyclic speed of operation, and sensor means associated with said reservoir means to control said first and second means by de-energizing the same when the reservoir means is substantially fully and by re-energizing the same when the reservoir means has reached a predetermined low level.

18. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said first means includes a rotatably mounted polygonal drum means open at the one end and closed at the other for receiving a supply of flat blanks oriented in the same direction, gripping means mounted in said drum means near a respective corner thereof for gripping an individual blank after the gripping means has passed through its lowest point during rotation of the drum means, and tripping means for releasing the gripping action of said gripping means as it approaches its highest point to release the blank carried along by said gripping means for removal out of said drum means.

19. A machine according to claim 18, further comprising conveyor means for transporting the released blank to said second means.

20. A machine according to claim 18, wherein said gripping means effectively form jaws which provide a normally open blank-receiving slot, and gravity-operated means for closing said blank-receiving slot and thereby holding fast a blank received therein as the gripping means is being raised during rotation of the drum means.

21. A machine according to claim 20, wherein said gripping means includes an actuating arm pivotally mounted on a relatively fixed part of the gripping means and provided with a clamping surface, an actuating member pivotally mounted on said relatively fixed part and pivotally connected with said actuating arm so as to pivot in a direction opposite to that of the actuating arm when actuated by the latter, said blank-receiving slot in its open condition being formed by a guide surface of said actuating member on one side and at least in part by the relatively fixed part on the opposite side, and said blank-receiving slot being closed to provide a clamping action by pivot movement of the actuating arm and therewith also of the actuating member so as to move the guide surface of said actuating member away from the relatively fixed part and bring the clamping surface of said actuating arm into its clamping position.

22. A machine according to claim 21, wherein said relatively fixed part is provided with a recess open in the direction of the blank-receiving slot for slidably receiving therein a spring-loaded guide member having a nose portion, and wherein said actuating member is in operative engagement with said guide member to displace the latter against spring action when said actuating member is pivoted by said actuating arm.

23. A machine according to claim 22, wherein said gravity-operated means includes a weight on said actuating arm.

24. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said second means includes means for positively feeding a blank delivered from said first means including a movable assembly movably guided for to and fro motion on a relatively fixed part and including longitudinal feed arms operable to engage with its free ends the blank.

25. A machine according to claim 24, wherein said second means includes means for turning the blank through 180° if not in proper position.

26. A machine according to claim 25, wherein said feed arms are provided with a step at their free ends and with an approximately V-shaped notch in the lower part of the step for engagement with a blank, and wherein said feed arms are mounted on said movable assembly to enable pivotal movement of the feed arms.

27. A machine according to claim 26, further comprising scale-like means for rejecting the blank if in excess of its normal predetermined weight.

28. A machine according to claim 27, wherein said last-mentioned means is gravity-operated.

29. A machine according to claim 27, wherein a blank is delivered into a space defined by plate-like step members disposed in front and to the rear thereof, as viewed in the feed direction, and means on said movable assembly for lifting the front plate-like member at the beginning of the feed movement.

30. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said third means includes two feed roller means spaced from each other at such a distance in relation to the thickness of the blank as to feed the blank by rotation of the roller means in mutually opposite directions, one of said feed roller means including clamping means for retaining the flat blank onto the surface of said one feed roller means so as to plastically deform the blank about the one feed roller means as the latter rotates, and actuating means for activating said clamping means as the leading portion of the blank passes through the feed roller means and for de-activating the clamping means upon completion of the deformation operation, wherein the blank is provided with complementary means in the inner and outer band portions operable to engage with one another as the blank nears completion of its deformation into a closed clamp, and wherein the other feed roller means includes means operable to engage with one of the complementary means to deform the same so as to provide a locking action to keep the deformed clamp closed.

31. A machine according to claim 59, wherein the other feed roller means is larger in diameter than the one feed roller means so that the other feed roller means rotates through less than 360° as the one feed roller means completes its rotation through at least 360°.

32. A machine according to claim 31, wherein said complementary means include an outwardly extending hook on the inner band portion operable to engage in an aperture in the overlapping outer band portion as the deformation operation nears its completion, and said means providing the locking action engaging the hook extending through the aperture and deforming the same to provide a positive locking action.

33. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said fourth means includes pick-up means having several pick-up finger members operable to engage with the outer surface of the clamp at the deformation station upon completion of the deformation operation, a support structure rotatably supporting thereon said pick-up means in such a manner as to enable selective pick-up of the clamp from the deformation station and release thereof over the object to be fastened, and actuating means operable to close the finger members in their position over the clamp in the deformation station, thereupon causing retraction of the pick-up means while retaining the deformed, closed clamp, thereafter rotating the pick-up means relative to the support structure to face the object to be fastened, thereupon mounting the clamp over the object and finally causing the clamp to be released by disengagement of the finger members.

34. A machine according to claim 33, wherein the object to be fastened is substantially circular in its outer surface, wherein said third means plastically deforms the blank into a substantially circular clamp whose diameter is slightly larger than the diameter of the outer surface of the object, and wherein the actuating means of said fourth means includes control means operable to plastically deform the clamp into a shape slightly non-circular while being transferred from said deformation station to said object and for elastically deforming the slightly non-circular clamp into its original, substantially circular shape before being mounted over the object so that upon release of the thus-deformed clamp the latter is held on the object in predetermined position by frictional engagement with the object.

35. A machine according to claim 34, wherein said pick-up means includes two circumferentially spaced pairs of oppositely disposed finger members, and wherein the last-mentioned plastic deformation of the clamp is realized by selective actuation of one pair of finger members and the elastic deformation by selective actuation of at least the other pair of finger members.

36. A machine according to claim 33, wherein the finger members hold the clamp in proper position until the fifth means has engaged the clamp to tighten the same, whereupon the finger members release the clamp and the pick-up means is returned to the third means.

37. A machine according to claim 36, wherein the clamp is provided with an outwardly extending, plastically deformable ear means, and wherein said finger members are so arranged along the circumference of the clamp as to leave the ear means freely accessible to said fifth means.

38. A machine for automatically installing a clamp having an outwardly extending ear on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said fifth means includes a pincer-like pneumatic tool having jaws adapted to be selectively closed by an actuating mechanism for engagement with the ear, and control means in the tool for admitting air under pressure to the actuating mechanism including throttle means for controlling the time required to reach a predetermined closing force of the jaws, and further means for discontinuing the application of air under pressure upon reaching the predetermined force.

39. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said first means includes rotatable drum means having gravity-operated gripping means for gripping an individual blank and hold the same during rotation of the drum means until released in predetermined position of the drum means, and wherein said second means includes a feed mechanism having gravity-operated means for determining the presence of more than one blank in the feed position and for ejecting the same in that case.

40. A machine according to claim 39, wherein said second means includes means for turning the blank through 180° during feed movement when the blank is in an inverted condition in its feed position.

41. A machine according to claim 40, wherein the second means includes sensor means responsive to the absence of a blank in the feed position to render the feed mechanism inoperable until the arrival of the next blank.

42. A machine according to claim 39, further comprising reservoir means between said second and third means for storing a number of flat blanks for subsequent use in the deformation station, and pick-up means for picking-up the lowest blank in said reservoir means and placing it into position for further processing by said third means.

43. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein said second means includes means for turning the blank through 180° during feed movement when the blank is in an inverted condition in its feed position.

44. A machine for automatically installing a clamp on an object to be fastened by the use of a flat blank from a quantity supply thereof, comprising first means for successively separating individual blanks from the supply of blanks, second means for feeding the individual blanks to a deformation station, third means at the deformation station for deforming the individual blank into a closed clamp slightly larger in its internal configuration than the object to be fastened thereby, fourth means for picking up the deformed clamp at said deformation station and for transferring it to the object where it is mounted over the object, and fifth means for tightening the clamp mounted over the object while held thereat in predetermined position, and wherein the second means includes sensor means responsive to the absence of a blank in the feed position to render the feed mechanism inoperable until the arrival of the next blank.

* * * * *